United States Patent
Shaw et al.

(10) Patent No.: US 11,519,091 B2
(45) Date of Patent: Dec. 6, 2022

(54) BATHLESS METAL-COMPOSITE ELECTROPLATING

(71) Applicant: United States of America as represented by the Secretary of the Navy, Patuxent River, MD (US)

(72) Inventors: Jason Shaw, Poquoson, VA (US); Yifan Yan, Clarksburg, MD (US); Troy Townsend, Lexington Park, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 395 days.

(21) Appl. No.: 16/843,202

(22) Filed: Apr. 8, 2020

(65) Prior Publication Data

US 2020/0325394 A1    Oct. 15, 2020

Related U.S. Application Data

(62) Division of application No. 16/379,237, filed on Apr. 9, 2019, now abandoned.

(51) Int. Cl.
| | |
|---|---|
| *C25D 15/00* | (2006.01) |
| *C25D 5/02* | (2006.01) |
| *C25D 9/08* | (2006.01) |
| *C25D 9/02* | (2006.01) |
| *C09K 11/70* | (2006.01) |
| *C23C 18/16* | (2006.01) |
| *C23C 18/42* | (2006.01) |
| *C09K 11/77* | (2006.01) |

(52) U.S. Cl.
CPC ............... *C25D 5/02* (2013.01); *C09K 11/70* (2013.01); *C09K 11/7706* (2013.01); *C23C 18/1646* (2013.01); *C23C 18/1662* (2013.01); *C23C 18/42* (2013.01); *C25D 9/02* (2013.01); *C25D 9/08* (2013.01); *C25D 15/00* (2013.01); *C09K 2200/0213* (2013.01); *Y10T 428/12146* (2015.01); *Y10T 428/25* (2015.01); *Y10T 428/256* (2015.01)

(58) Field of Classification Search
CPC ............................... C25D 15/00; C25D 15/02
See application file for complete search history.

(56) References Cited

U.S. PATENT DOCUMENTS

| | | |
|---|---|---|
| 5,514,479 A | 5/1996 | Feldstein |
| 5,834,065 A | 11/1998 | Feldstein |
| 2011/0305919 A1 | 12/2011 | Conroy |

*Primary Examiner* — Adam Krupicka
(74) *Attorney, Agent, or Firm* — Mark O. Glut; NAWCAD

(57) ABSTRACT

A bathless plating for a conductive material with composite particles or with high surface coverage. The setup for the bathless electro-plating includes a cathode, a composite mixture, a membrane, and an anode. The cathode is a conductive material. The composite mixture comprises a metal salt, an acid, and a composite material. The composite mixture is applied to the cathode. A hydrophilic membrane is applied to the composite mixture. An anode, with oxidizing properties, is applied to the membrane. A current is applied to the bathless setup. Upon removing the current and composite mixture from the cathode, a metal-based composite coating remains on the cathode.

1 Claim, 2 Drawing Sheets

BATHLESS METAL-COMPOSITE ELECTROPLATING

STATEMENT OF GOVERNMENT INTEREST

Figure 1:
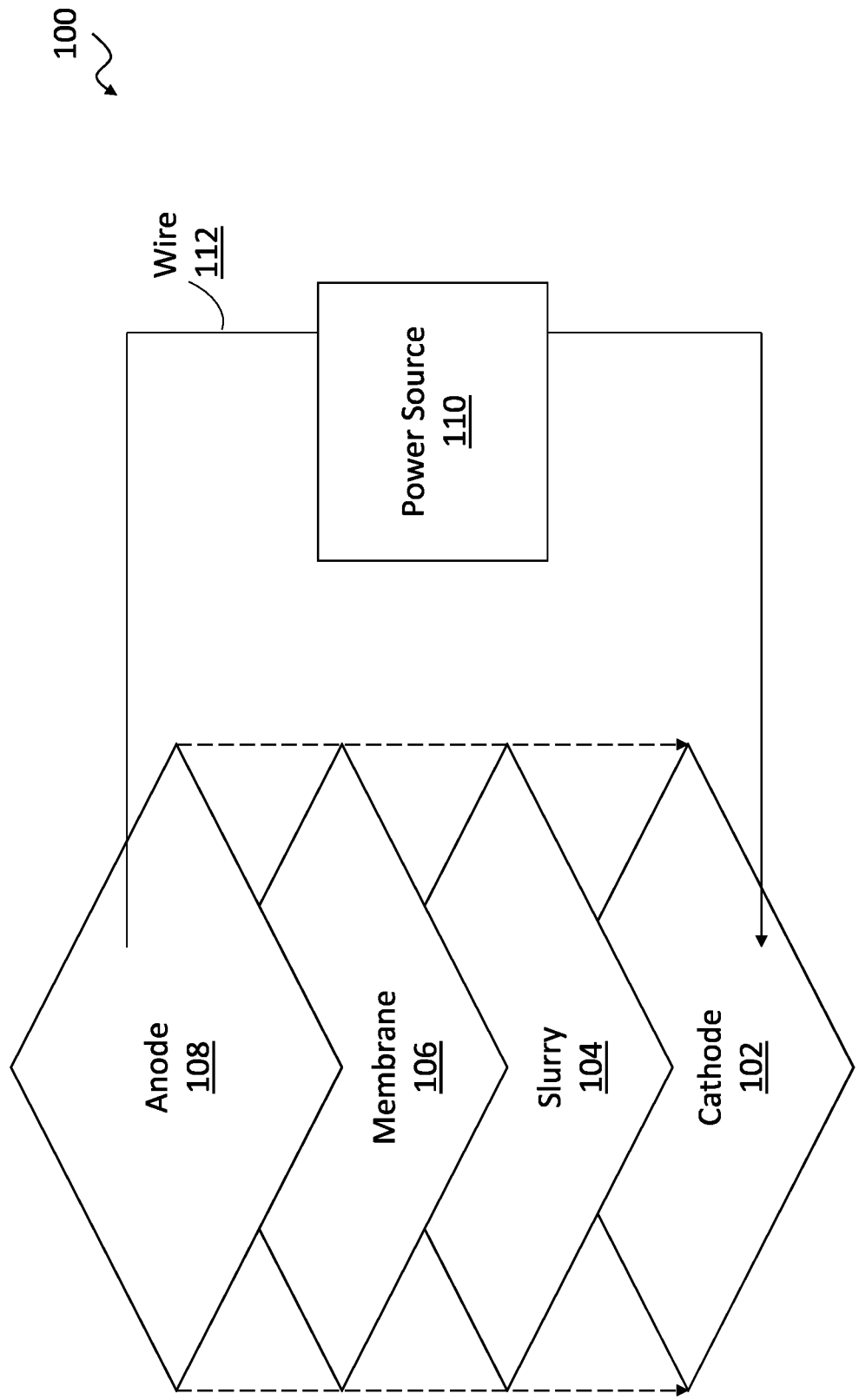

The invention described herein may be manufactured and used by or for the Government of the United States of America for governmental purposes without payment of any royalties thereon or therefor.

BACKGROUND

Electroplating is a process that uses electric current to reduce dissolved metal cations to form a thin coherent metal coating on an electrode. Electroplating is primarily used to change the surface properties of an object. For example, electroplating can be used to create better wear resistance, corrosion protection, lubricity, or aesthetic qualities.

Fluorescence and phosphorescence are types of photoluminescence. Phosphors are materials that fluoresce or phosphoresce after absorbing light. Fluorescent materials re-emit light radiation only during the time of light absorption, and phosphorescent materials also re-emit light after the excitation light is removed. Phosphors are commonly used in paints, toys, lighting, anti-counterfeiting measures, among other applications. Phosphorescent materials can be organic or inorganic; however, inorganic phosphors tend to be more stable when exposed to light, heat, and air.

A characteristic property of inorganic phosphors is the inherent nature of excited electrons upon excitation. As the electrons of the inorganic phosphor relax, they can release energy as light. In some environments, especially where the electrons are in close proximity to a conductor, such as a metal substrate, the electrons are not able to relax and therefore do not emit light—a process known as quenching. Quenching poses a problem where phosphors are in close proximity to a conductor and where the phosphor particle size is limited to nanometer and micrometer diameters; for example, under traditional electroplating conditions.

There are also known limitations on the size of particles that can be plated using traditional bath electroplating. Due to particle selectivity, traditional bath electroplating does not effectively plate particles having a size more than a few micrometers. This selectivity has significantly limited the types of coatings that can be applied via bath electroplating.

SUMMARY

In general, in one aspect, a metal-composite electroplated coating manufactured by the method of: in a bathless setup comprising a cathode, a composite mixture, a membrane, and an anode, assembled by applying the composite mixture to the cathode, wherein the cathode is a conductive material, and wherein the composite mixture comprises a metal salt, an acid, and a composite material; applying the membrane to the composite mixture, wherein the membrane is hydrophilic; applying the anode to the membrane, wherein the anode is a material with oxidizing properties; and applying a current to the bathless setup.

Unless otherwise defined, all technical and scientific terms used herein have the same meaning as commonly understood by one of ordinary skill in the art to which this invention belongs. Other features and advantages will be apparent from the following detailed description.

DRAWINGS

Figure 2:
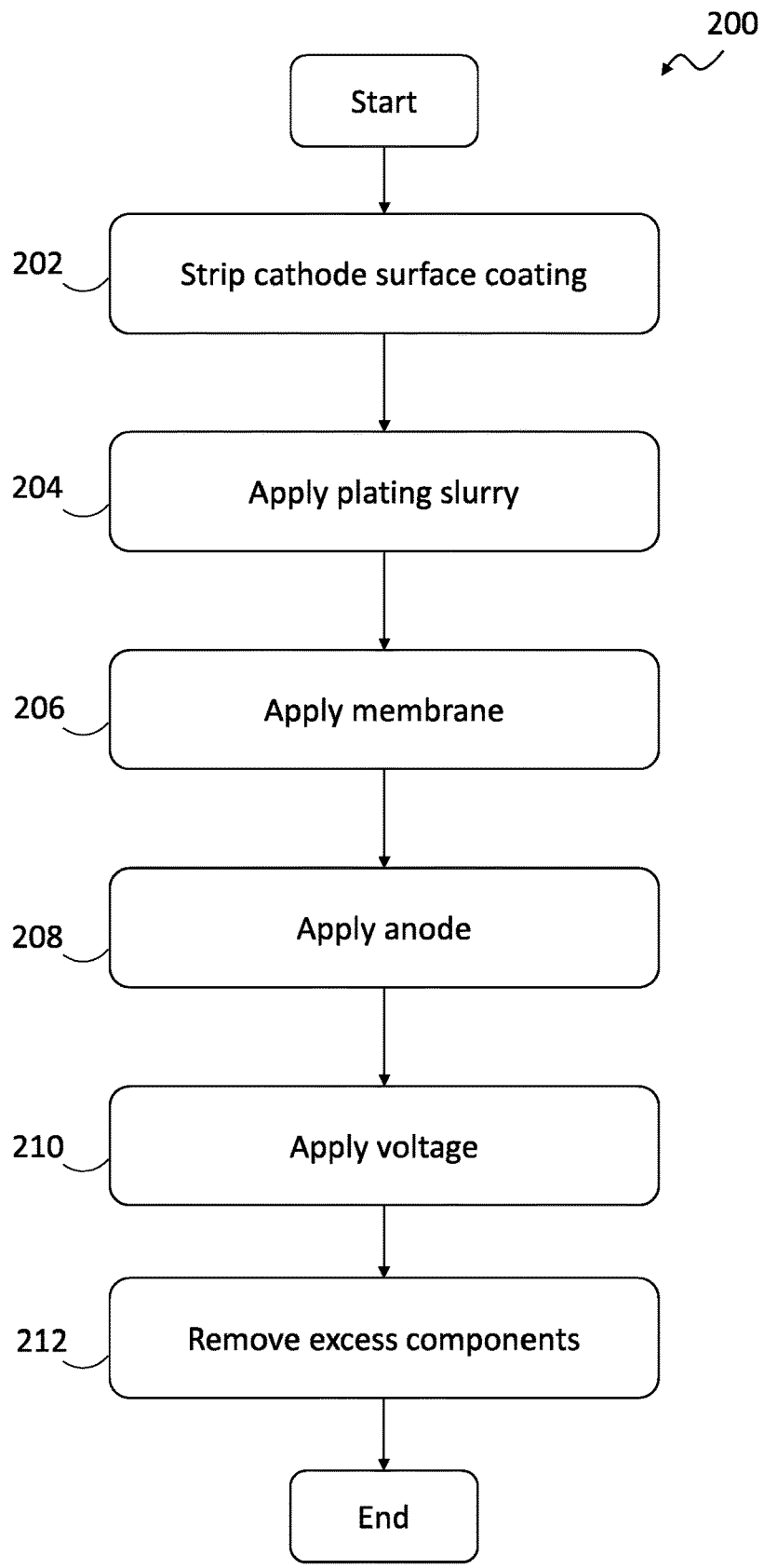

These and other features, aspects and advantages of the present invention will become better understood with reference to the following description and appended claims, and accompanying drawings wherein:

FIG. 1 is a block diagram depicting components of one embodiment of the present invention; and FIG. 2 is a process diagram depicting one embodiment of the present invention.

DETAILED DESCRIPTION

Embodiments of the present invention recognize a need for metallic coatings having composite particles. Traditional bath electroplating methods have not shown to be effective for the application of large composite materials onto metals. Embodiments of the present invention provide a means for plating a metal object with a composite metal film containing large particles.

Embodiments of the present invention can be used to make coatings containing photo-luminescent particles. Despite the wide applicability of the visual properties, inorganic phosphors have not been widely adapted for metal surfaces, perhaps due to limitations in existing bath electroplating processes. Embodiments of the present invention, utilizing photo-luminescent particles, provide a means of plating conductive objects, such that they can be identified in environments where lighting is scarce; for example, on metals used in manufacturing and mechanical applications, where lighting may be limited or non-existent.

Embodiments of the present invention recognize that there are limitations of electrochemical bath plating of composite particles into a metal matrix. Limitations include: (1) low surface coverage of inert particles resulting in relatively low solution concentrations, (2) physical barriers created by hydration spheres around hygroscopic particles, and (3) small size of particles incorporated into the coating as a result of a strong preference for metal ions over the dispersed composite material.

Embodiments of the present invention address the limitations posed by electrochemical bath plating of inorganic phosphors as an example of bath-less plating of large composite particles. Embodiments of the present invention utilize a bathless gravity-assisted plating method. Embodiments of the present invention allow for high surface coverage and incorporation of hygroscopic inert composite particles (e.g., phosphors), which can be relatively large (e.g. >200 µm). Throughout, reference will be made to "large composite particles," which includes particles having a diameter greater than 20 µm. However, the method described within can be used to electroplate composite materials of any size.

Embodiments of the present invention utilize a bathless, gravity-assisted electroplating method. The conductive surface of the object being plated (i.e., the cathode) is topped with dry coating salts, containing the composite material. A relatively small amount of water is added to the dry coating to increase the conductivity of the electrolyte. Lastly, an ion permeable membrane is applied before layering the anode and applying a voltage. As a result, the conductive object has a coating containing the composite material. In some embodiments of the present invention, the cathode is plated with a photo-luminescent coating.

Throughout the description of the invention, reference is made to hygroscopic particles and composite particles, these terms are used interchangeably within, and should not be read to exclude one another. Throughout the description of the invention, examples are provided of electroplating a cathode with a photo-luminescent or phosphorescent coatings. This description is by way of example and should not be read to exclude the coating of any composite material via the bathless plating method.

In the following detailed description, reference is made to the accompanying drawings, which show, by way of illustration, specific embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art.

Turning now to the figures, FIG. 1 depicts a block diagram of components of one embodiment of the present invention. FIG. 1 depicts metal-composite electroplating environment 100.

Metal-composite electroplating environment 100 includes cathode 102, composite mixture 104, membrane 106, anode 108, power source 110, and wire 112.

Cathode 102 is the object being electroplated with metal-composite material. Cathode 102 may be any conductive surface. In some embodiments, cathode 102 is metallic in nature. For example, cathode 102 may be, in whole or in part, aluminum, cadmium, chromium, copper, gold, iron, lead, nickel, platinum, silver, steel, tin, titanium, zinc, or any combination thereof. In other embodiments, cathode 102 is may be a conductive non-metal material. For example, cathode 102 may be graphene, graphite, or carbon nanotubes. In still other embodiments, cathode 102 may be a conductive organic material; for example, conductive plastic.

Composite mixture 104 is a salt-based coating mixture. In some embodiments, composite mixture 104 is a composition of salts, acid, a powder containing composite material, and, in some embodiments, water. However, in other embodiments, composite mixture 104 is a dry mixture. In these embodiments, water may be added to composite mixture 104 prior to applying membrane 106. In one embodiment of the present invention, composite mixture 104 contains nickel (II) sulfate hexahydrate, nickel (II) chloride tetrahydrate, boric acid, composite particle powder, and water; where the ratio of components by mass are 10:1.8:1.6:1.8:0.2, respectively.

The salt, acid, and composite powder components may be determined based on a number of desired coating qualities. In some embodiments, the metal in the final coating may be a determinate. For example, a chromium coating may be desired for its wear-resistance properties.

In this example, the salts and acids used in composite mixture 104 will be determined based on their compatibility with chromium. One of ordinary skill in the art can identify complimentary salt and acid pairs for the desired coating type.

In some embodiments, the composite material has photo-luminescent properties. In these examples, the photo-luminescent powder can be chosen based on its stability. The half-life or stability of a phosphor could affect how long a coating maintains its photo-luminescent qualities. In other embodiments, the photo-luminescent powder can be selected based on the desired luminescent color. For example, a composite mixture containing $xSrO:yAl_2O_3$: $Eu^{2+}$, $Dy^{3+}$ results in a green-blue luminance. In another example, $Y_2O_3:Eu^{2+}$ results in a red luminance. In yet another example, $BaMgAl_{10}O_{17}:Eu^{2+}$ results in a blue luminance.

In some embodiments, the composite material is selected based on other properties. Bathless plating method 200, described within, could be used to incorporate a range of composite materials based on the intended use of the coating. For example, organic polymer particles such as polytetrafluoroethylene (PTFE) and polycarbonmonofluoride may be used to reduce the friction of the coating. In another example, the incorporation of diamond, tungsten carbide, silicon carbide, and/or chromium carbide particles may be used in place of, or in addition to the phosphor to increase the wear resistance and hardness of the coating. In another example, titanium dioxide is used to add pigment to the coating.

Membrane 106 acts as a physical barrier and a bridge for ions between cathode 102 and anode 108. Membrane 106 allows for the transport of metal ions from anode 108 to cathode 102. Membrane 106 is hydrophilic, which permits the transport of metal ions to balance the charge of composite mixture 104. In one embodiment, a thin (i.e., micrometers thick) nylon sheet is used.

Anode 108 is a metal object used for sacrificial ions in the bathless plating process. Any oxidizing material can be used as anode 108. In some embodiments, an anode material may be selected based on its oxidizing properties. Some metals oxidize more favorably and, as a result, will propel the plating process at a lower resistance.

In some embodiments, the anode metal may incorporate metal ions in composite mixture 104. As a result, for long coating times, the anode metal may be incorporated into the coating. Where the mixture of metals is undesired, the anode metal should be based, at least in part, on a metal component of composite mixture 104.

Power source 110 is a means of applying electrical energy to metal-composite electroplating environment 100. In some embodiments, power source 110 is a battery. For example, in one embodiment, power source 110 is a 1.5V battery. In other embodiments, power source 110 may be a power supply. The current density and the length of bathless plating method 200 can be manipulated to modify the metal to composite material ratio of the coating. In one example, 0.01 $A/cm^2$ was determined to be a suitable current density. However, in this example, a lower current density resulted in a metal-heavy (i.e., low composite) coating and a higher current density resulted in a greater phosphor dense coating. However, in the above example, 0.01 $A/cm^2$ was chosen based on durability of the coating.

In at least one embodiment, the present invention is used to plate a photo-luminescent coating; for example, the composite material may be an inorganic phosphor.

FIG. 2 depicts bathless plating method 200, which is one example process of the present invention. The process, as depicted in FIG. 2, contemplates a bathless stamping method. One skilled in the art will recognize that functions described in the block diagram may occur out of order noted in the figure. For example, two blocks shown in succession may, in fact, be executed substantially concurrently, depending upon the functionality involved.

In step 202, the object to be plated, cathode 102, is prepared. In some embodiments, cathode 102 does not need to be prepared. For example, where the surface of cathode 102 is reactive to plating, no special preparation may be required. In other embodiments, preparation is determined based on a coating on cathode 102. For example, where cathode 102 has a chromium coating—common on many tools—preparation may include: (1) sanding cathode 102 surface, (2) dipping or wiping cathode 102 with concentrated HCl, or (3) anodic stripping. In another example, where cathode 102 is a metal oxide, nickel, or steel, preparation may include: (1) sanding cathode 102 surface, (2) an acid treatment, or (3) anodic stripping. In yet another example, where cathode 102 is plastic or organic, preparation may include: (1) sanding cathode 102 surface and (2) cleaning with an alkali treatment.

In at least one embodiment, the present invention is contemplated for use in a mechanical/manufacturing environment. For example, to coat mechanical tools (e.g., a wrench, a screwdriver, etc.) or components of machinery or engines. In many examples in the mechanical/manufacturing setting, the object to be plated may comprise a protective coating for wear resistance. A protective coating may be applied to enhance resistance to corrosion, wear abrasion, heat, light or oxidation. In these examples, the protective coating may need to be stripped from the object in order to complete the plating process. However, in other environments, such a protective coating may not be used or a different coating may exist. Therefore, some steps, such as preparation of cathode 102 (step 202) may take on a different form. Persons having ordinary skill in the art will recognize these differences as analogous variations and therefore within the spirit of the proposed method.

In step 204, the composite mixture is applied to the top side of the cathode 102. Embodiments of the present invention utilize gravitational forces for the plating of composite particles on the cathode. In these embodiments, one side of the object, the side having the greatest gravitational effects, is coated at a time. Therefore, in instances where multiple sides of an object need to be coated, bathless plating method 200 will need to be completed multiple times.

In step 206, membrane 106 is applied over composite mixture 104. In some embodiments, where composite mixture 104 is a dry mixture, a few drops of water are added prior to adding membrane 106. In some embodiments, the addition of water activates electrolytes in composite mixture 104, which will assist in ion transfer from anode 108 to cathode 102.

In step 208, the anode is applied to the membrane. In some embodiments, the anode is made of nickel. In other embodiments, the anode material is made of another conductive material.

In step 210, current is applied to the anode and cathode. The strength and timing of the current density (current per area) and voltage may vary based on the application. In some embodiments, a current density of approximately 0.01 A/cm$^2$ is acceptable for coating. The time in which the current is applied varies based on the desired properties of the coating.

In some examples, the current is applied until a desired coating thickness is achieved. For example, where composite mixture 104 contains composite material having a large diameter. In this example, it may be advantageous to have a coating thickness at least as thick as the composite material diameter. Therefore, current would be applied to the anode and cathode until such thickness is attained. In another example, such as where the composite material has photo-luminescent properties, current is applied until a desired intensity of the photo-luminescence is achieved. In some embodiments, the desired intensity is related to the concentration of composite material in the coating.

In step 212, the anode, membrane, and excess composite mixture is removed from the cathode. As bathless plating method 200 is gravity assisted, only the portion of cathode 102 which opposes gravitational force during the coating process will have a metal-composite coating. Therefore, if a metal-composite coating is desired on multiple sides of an object, each side must be coated at separate intervals of time, such that the object can be reoriented to have each side oppose the gravitational force.

In an example utilizing a phosphor composite material, prior to bathless plating method 200, described within, cathode 102 has no photo-luminescent properties. As a result of bathless plating process 200, cathode 102 has a light activated fluorescence or phosphorescence.

The above description is that of current embodiments of the invention. Various alterations and changes can be made without departing from the spirit and broader aspects of the invention as defined in the appended claims.

What is claimed is:

1. A metal-composite electroplated coating prepared by the process comprising the steps of:

applying a composite mixture to a cathode, wherein the cathode is a conductive material, and wherein the composite mixture comprises a metal salt, an acid, and a composite material;

applying a membrane to the composite mixture, wherein the membrane is hydrophilic; applying an anode to the membrane, wherein the anode is a material with oxidizing properties;

and applying a current to the anode and the cathode, wherein the composite material has a diameter greater than 20 μm.

* * * * *